Sept. 5, 1950      P. K. MERISUO      2,521,473
CAMERA SUPPORT
Filed July 21, 1947
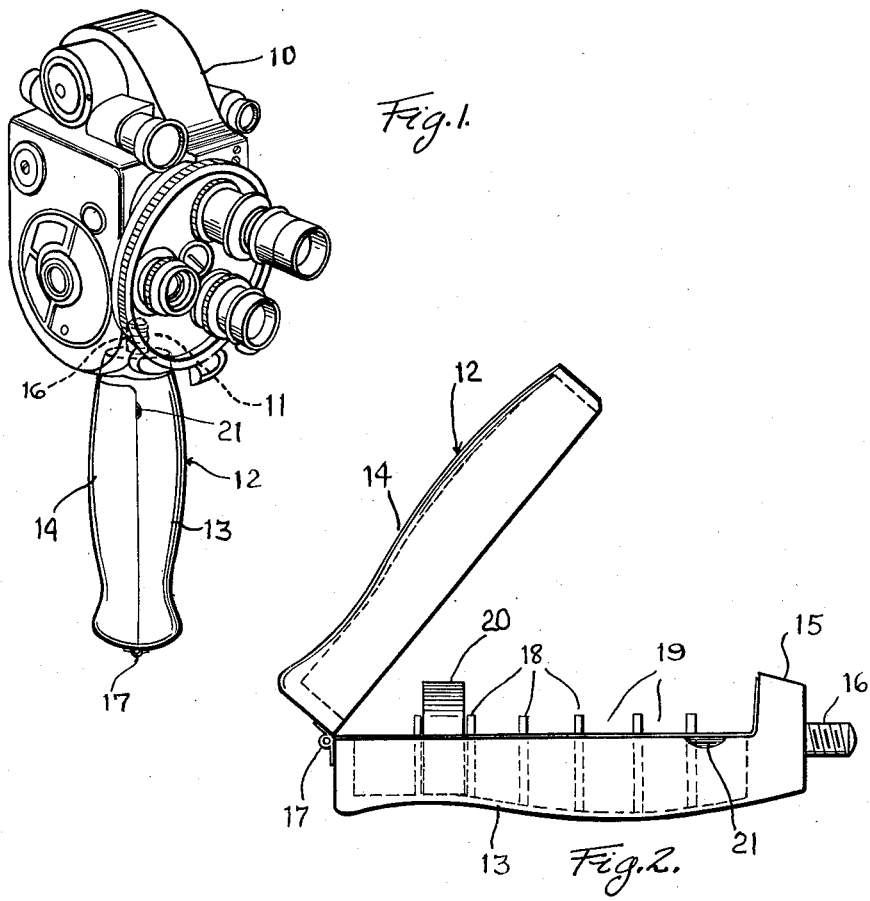
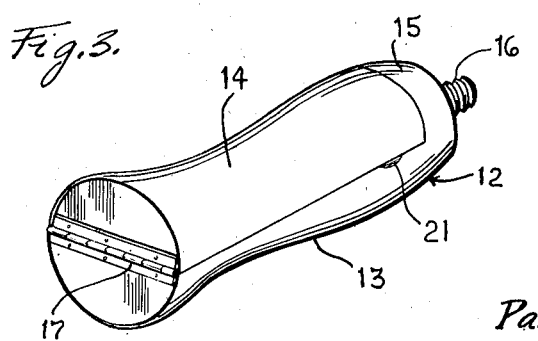
INVENTOR.
Paul K. Merisuo
BY
His Attorney.

Patented Sept. 5, 1950

2,521,473

UNITED STATES PATENT OFFICE 2,521,473

CAMERA SUPPORT

Paul K. Merisuo, River Grove, Ill.

Application July 21, 1947, Serial No. 762,230

1 Claim. (Cl. 95—86)

My invention relates to certain new and useful improvements in camera supports and more particularly, to a supporting handle for a camera in which provision is made for the storage of a plurality of filter elements, or the like.

One of the principal objects of the invention is the provision of such a supporting handle in which the handle comprises hinged sections with one of the sections providing a plurality of storage compartments with the hinged sections so related to each other as to permit access to the storage compartment without detaching the handle from supporting position with respect to the camera.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a perspective view of a conventional camera showing my improved supporting handle associated therewith;

Fig. 2 is a side elevational view of the handle with a part thereof in open position; and Fig. 3 is a perspective view of the handle.

The several objects of my invention are accomplished by the preferred form of construction as shown in the accompanying drawings and in which a standard and conventional camera is indicated at 10. This camera includes an insert, or threaded bore 11, to which the usual stud screw of a tripod is attached by threading the same therein.

My invention particularly relates to a supporting handle to be substituted for the usual tripod. In this connection, the handle is indicated generally at 12 and comprises a handle section 13 which for convenience may be referred to as the storage section of the handle. It further comprises a cover section 14, the cover section 14 being of a shorter length than the storage section 13 to provide a head 15 from which extends a screw stud 16. This stud 16 is adapted to be threaded into the insert, or threaded bore 11.

By making the cover section 14 of a shorter length than the storage section 13, the handle is not only provided with a solid head 15 but also the arrangement permits moving the cover section 14 to open position without detaching the handle from the camera 10.

This storage section 13 and the cover section 14 are hinged together at their base by a suitable hinge 17.

The storage section 13 is provided with a plurality of spaced partitions 18 providing therebetween compartments 19 into which the filter cases 20 are adapted to be confined.

The cover section 14 is adapted to have frictional contact with the head 15 whereby the cover section 14 may be frictionally retained in closed position or in lieu of this arrangement, the hinge 17 may be of the self-closing type.

If desirable, suitable finger tip notches 21 may be formed in the storage section 13 to facilitate manipulation of the cover section 14 to open position.

From the foregoing description it is apparent that I provide a supporting handle which is simple in construction and one which will be highly efficient in use.

The handle may be formed of any suitable material.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having thus described my invention, what I claim as new and desire to protect by Letters Patent is:

For a combination comprising a hollow handle including two elongated confronting sections, means for hinging the sections together at corresponding end portions for positioning together in parallel relation with respect to each other in the direction of their length, one of said sections being of a length shorter than the other of the sections, the said other of the sections providing at its end opposite the hinge connection between said sections a mounting head having a portion overlapping the adjacent end of the said one of said sections, and a camera attaching screw carried by and extending from said head.

PAUL K. MERISUO.

REFERENCES CITED

The following references are of record in the file of this patent:

UNITED STATES PATENTS

| Number | Name | Date |
| --- | --- | --- |
| 267,517 | Gray | Nov. 14, 1862 |
| 942,077 | Kener | Dec. 7, 1909 |
| 2,427,593 | Etzel | Sept. 16, 1947 |